United States Patent [19]

Frey

[11] 4,101,943

[45] Jul. 18, 1978

[54] CONTROLLED-WIDTH-SYNCHRONIZATION OF RECORDED PIXELS

[75] Inventor: Thomas M. Frey, Brighton, N.Y.

[73] Assignee: Xerox Corporation, Stamford, Conn.

[21] Appl. No.: 747,283

[22] Filed: Dec. 3, 1976

[51] Int. Cl.² ............................................. G11B 5/52
[52] U.S. Cl. ...................................................... 360/84
[58] Field of Search ..................... 360/84, 52, 51, 101, 360/55

[56] References Cited

U.S. PATENT DOCUMENTS

| | | | |
|---|---|---|---|
| 3,412,385 | 11/1968 | Wang et al. | 360/51 |
| 3,454,930 | 7/1969 | Schoeneman | 360/52 |
| 3,521,260 | 7/1970 | Alaimo | 360/51 |
| 3,576,584 | 4/1971 | Cone et al. | 360/90 |
| 3,577,132 | 5/1971 | Anderson et al. | 360/51 |
| 3,831,196 | 8/1974 | Thorpe | 360/52 |
| 3,898,690 | 8/1975 | Desai | 360/51 |
| 4,005,479 | 1/1977 | Hunnicutt et al. | 360/51 |

*Primary Examiner*—Vincent P. Canney
*Attorney, Agent, or Firm*—James J. Ralabate; John E. Beck; George J. Cannon

[57] ABSTRACT

Synchronization of pixels in tracks of magnetically recorded information is provided by insuring that pixels are of substantially uniform width, particularly the first recorded pixel in each recorded track. Uniform width of pixels, particularly first pixels, is achieved through a triggering circuit which begins recording the first pixel of each track only when the record head is at the proper location. The circuit is capable of delaying the recording of a track to within a pixel length of time and divides the pixel length of time to some predetermined plurality of track recording starting points.

6 Claims, 4 Drawing Figures

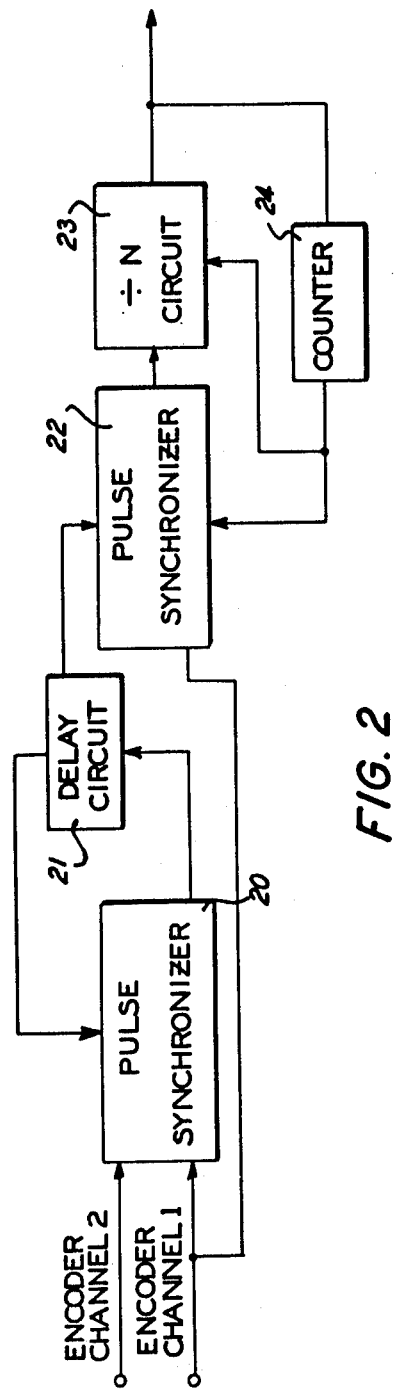
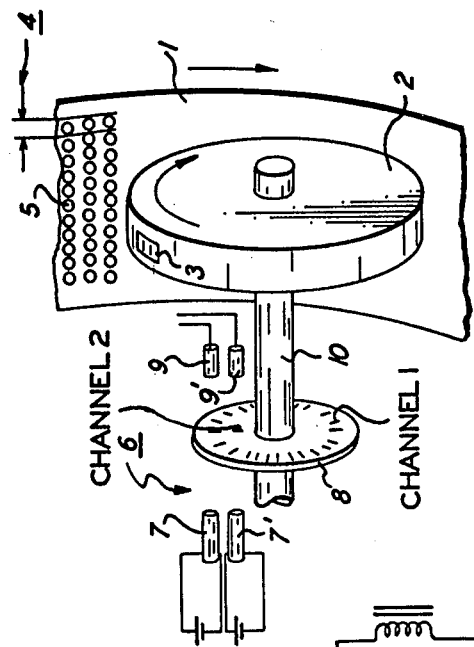
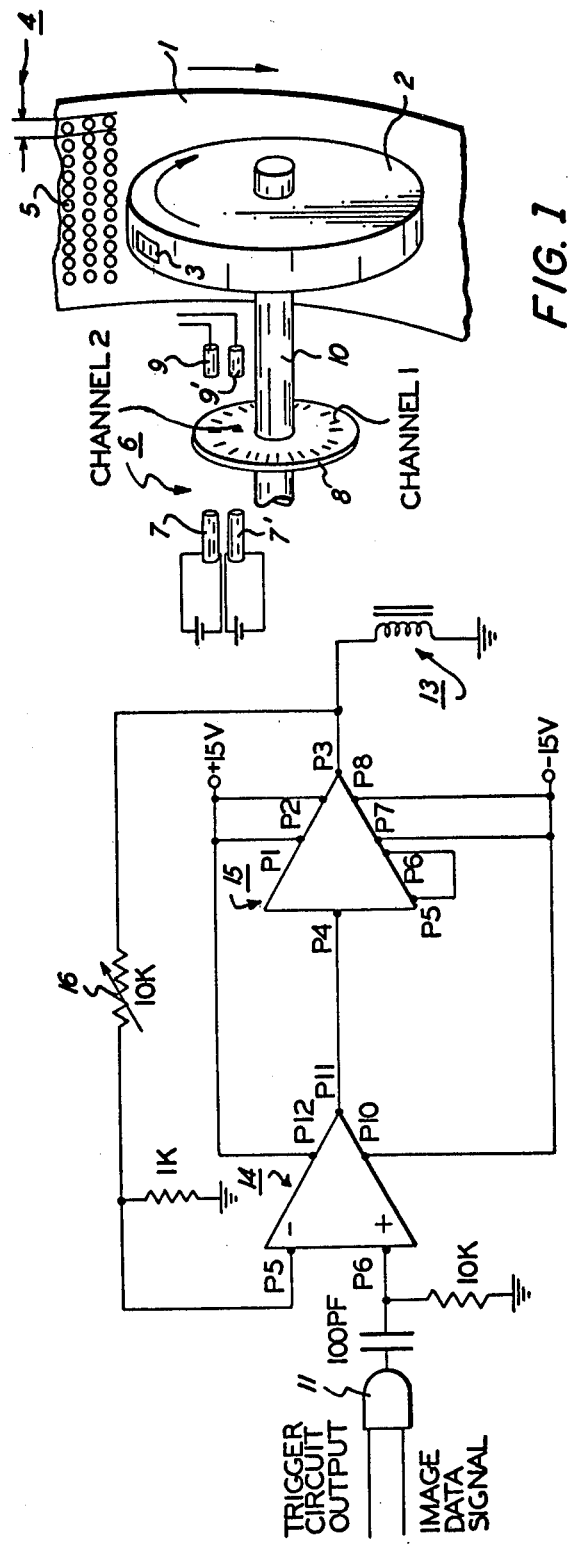

CONTROLLED-WIDTH-SYNCHRONIZATION OF RECORDED PIXELS

BACKGROUND OF THE INVENTION

This invention relates to magnetic imaging, and more particularly to synchronization of recorded pixels in magnetically recorded tracks of information.

A pixel on a magnetic recording is the area of magnetic transition or gradient from one magnetic pole to an opposite pole. In recording directly, current through magnetic record heads is reversed to generate a magnetic field gradient. This magnetic field gradient is recorded on the magnetic recording medium such as magnetic tape and is referred to herein as a pixel.

Pixels in adjacent recorded tracks must be in proper phase alignment in order to prevent cancellation of the magnetic field between the tracks. Thus, alignment of the pixels must be obtained to avoid deletion of image information. However, this alignment can be achieved only when the pixels are of substantially uniform width.

The present invention provides substantially uniform width of pixels, particularly first pixels in recorded tracks, and achieves substantial track-to-track pixel alignment to minimize interference between recorded magnetic field gradients.

SUMMARY OF THE INVENTION

Therefore an object of this invention is to achieve substantial uniformity of recorded pixel width.

Another object of this invention is to provide substantial track-to-track pixel alignment in magnetically recorded images.

A further object of this invention is to minimize interference between magnetic field gradients in a magnetically recorded image.

Yet another object of this invention is to reduce the tolerance on the location of record heads around the outer circumference of a rotating recording member.

In accordance with the practice of the present invention, these and other objects are achieved by a circuit which takes a system clock signal at a multiple frequency of the recording frequency from one channel of an optical encoder and takes a recording head position signal from a second channel of the optical encoder, delays its output until the recording head is in the correct position to record first track pixels of substantially uniform width and reduces the frequency of its output to the desired recording frequency.

BRIEF DESCRIPTION OF THE DRAWINGS

FIG. 1 is a schematic illustration of the rotational magnetic recording member and optical encoder used in the practice of the present invention.

FIG. 2 is a block diagram of the triggering circuit used to practice the present invention.

FIG. 4 is a schematic of a circuit for a write driver for driving a magnetic recording head.

DETAILED DESCRIPTION OF THE PREFERRED EMBODIMENTS

Figure 3:
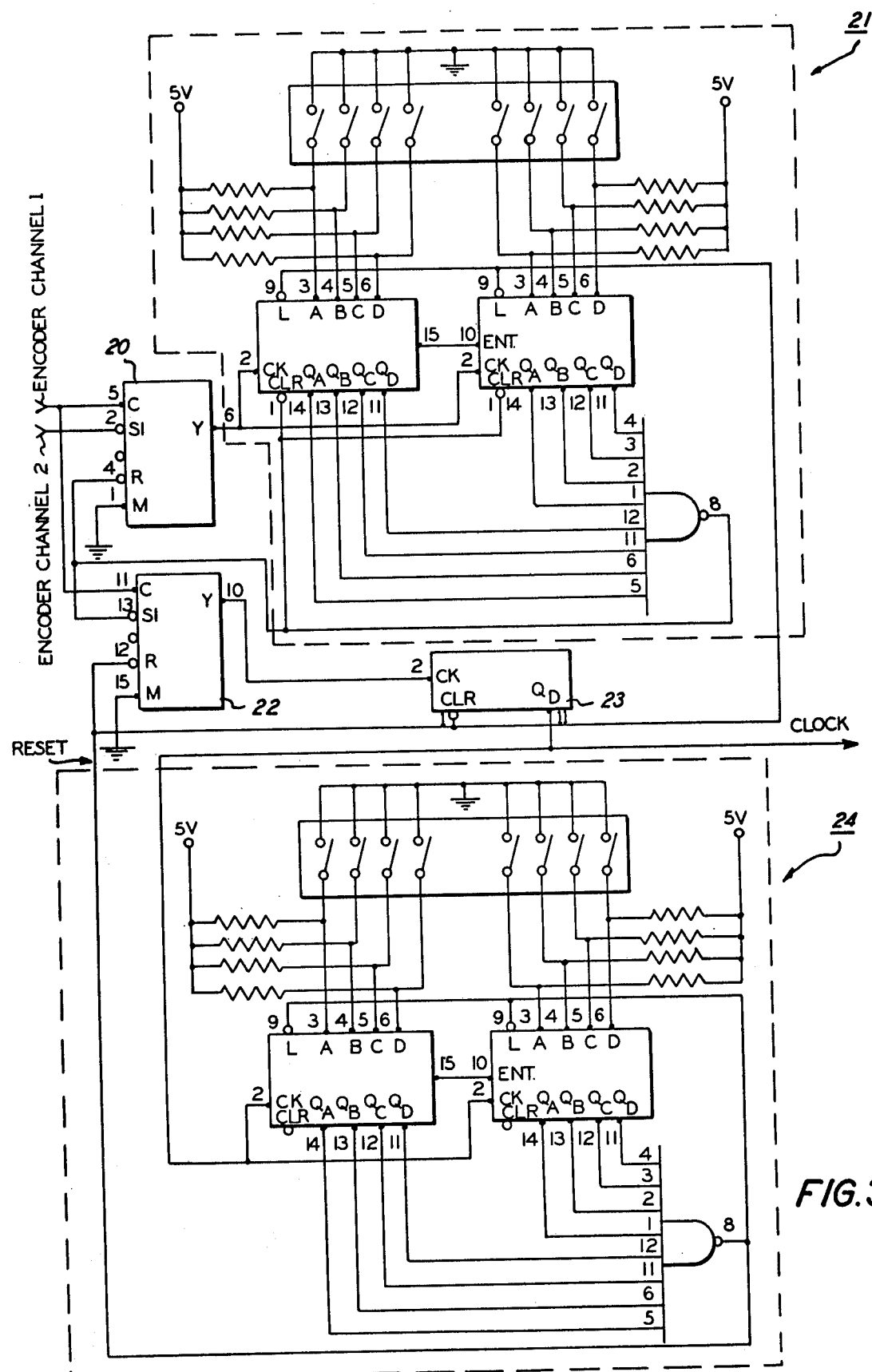
FIG. 3 is a schematic of a circuit embodiment of FIG. 2.

Referring to FIG. 1, the magnetic recording head 3 for direct recording rotating disc 2 is located on the outer circumference of disc 2. The optical encoder 6 comprises a two channel mask 8 having a multiplicity of alternating transparent and opaque portions in channel one and either one opaque or transparent portion in channel two. Stationary light emitting diodes 7 and 7' are mounted within the recording device and positioned to direct light upon mask 8 at channel two and channel one, respectively. Phototransistors 9 and 9' are mounted stationary within the recording device on the side of mask 8 opposite the side on which are mounted the light emitting diodes. Phototransistor 9 is positioned to receive light from light emitting diode 7 passing through transparent portions of channel one and, phototransistor 9' is similarly positioned but to receive light from light diode 7' passing through the transparent region of channel two.

With respect to each channel of mask 8, light transmitted through transparent portions of mask 8 is chopped into pulses or bits of light having a frequency dependent upon the speed of rotation of the shaft upon which it is mounted and the number of transparent and opaque portions on the mask.

The number of opaque lines in channel one of mask 8 is chosen as some convenient, predetermined multiple of the desired recording frequency. As will be seen later, the higher this multiple then the greater the number of starting points within a pixel length of time is provided. Channel two contains one opaque or transparent portion for each record head mounted on rotating magnetic recording member 2.

Pixels 5 are shown in FIG. 1 as recorded in tracks 4. Magnetic recording medium 1, such as a magnetic tape, is guided around rotating magnetic recording member 2 and held stationary while recording member 2 rotates in recording tracks from top to bottom of FIG. 1, and translates from left to right or from right to left in recording the next succeeding track.

Phototransistors 9 and 9' undergo a variation in voltage and current in their collector circuits when the phototransistors are struck by light. The collector circuit of phototransistor 9 undergoes such a variation at a frequency corresponding to the frequency of the bits of light passing through channel one. The collector circuit of phototransistor 9' undergoes such a change only once per revolution per record head; going from low to high when using a transparent portion for signal generation and going from high to low when using an opaque portion for signal generation. In FIG. 1, only one recording head is utilized and therefore only one opaque line in channel two of optical encoder 6 is provided. Accordingly, phototransistor 9 provides a signal having a frequency which is some predetermined multiple of the desired recording frequency while phototransistor 9' provides a low, "notch" signal indicative of the position of magnetic recording head 3.

Referring now to FIG. 2, the signal from phototransistor 9 (from encoder channel one) and the signal from phototransistor 9' (encoder channel two) are inputted into pulse synchronizer 20. The signal from channel one is also fed into pulse synchronizer 22. The signal from channel one which is fed into pulse synchronizer 20 is not allowed to pass therethrough until pulse synchronizer 20 is started by receipt of the "notch" in the signal of channel 2. Upon receipt of the "notch" or low point in the signal from channel two, pulse synchronizer 20 passes the high frequency signal of channel one into delay circuit 21. When using a transparent portion of channel two for signal generation, synchronizer 20 is chosen to be started upon receipt of a pulse in the signal from channel two. When the counters of delay circuit 21 count up to the number preset, it generates a pulse which stops pulse synchronizer 20 and starts pulse synchronizer 22. Upon starting, pulse synchronizer 22 allows the high frequency signal from channel one which is fed to it to pass and start the "divide by N" circuit. If the desired recording frequency is represented by the letter F, then channel one of mask 8 of optical encoder 6 will have N times F opaque lines and the same number of transparent portions so that the optical bit frequency of optical encoder 6 at the desired rotational speed of shaft 10 provides a channel one signal having a frequency of N times F. Thus, the synchronized channel one output from pulse synchronizer 22 enters the "divide by N" circuit at a frequency of N times F and emerges at a frequency of F, the desired recording frequency. The desired recording frequency F is fed into one input of AND gate 11 of FIG. 4. At the same time, the output of the "divide by N" circuit is also fed into counter 24 which counts up to the number set equal to the number of pixels desired in the recorded tracks. When counter 24 reaches the count set, it generates a pulse which resets and inactivates "divide by N" circuit and which stops pulse synchronizer 22.

It will be appreciated that the counters in delay circuit 21 are counting at the rate of N times F whereas counter 24 is only counting at the lower rate of F. Therefore, the effect of delay circuit 21 is to effectively delay receipt of a notch pulse from channel two by pulse synchronizer 20 only a few percentage of a revolution of shaft 10 of FIG. 1. However, this is sufficient and effectively allows N number of starting points for starting the recording of the first pixel of the next track. For example, if channel one of optical encoder 6 has sixteen times the number of opaque lines and transparent portions as the desired recording frequency F, the length of time ordinarily consumed by recording one pixel is divided into sixteen parts, the beginning of each of which the recording of that pixel can be initiated by the circuit of FIG. 2.

Referring now to FIG. 3, there is seen a schematic of a typical suitable circuit for performing the functions described in connection with the block diagram of FIG. 2. The resistances shown in FIG. 3 can all be suitably selected to have a value of about 1,000 ohms. All integrated circuit components depicted in in FIG. 3 can be obtained from either Texas Instruments or Fairchild Corporation under the following items numbers. Pulse synchronizers 20 and 22, under Item No. 74120; circuit 23, under Item No. 74161; the counters in delay circuit 21 and counter 24, under Item No. 74161; the AND gate in delay circuit 21 and counter 24, under Item No. 7430. The output of FIGS. 2 and 3 at the desired recording frequency F is combined with the image data signal in FIG. 4 by AND gate 11. The output of the AND gate 11 is at desired recording frequency F and enters the write driver circuitry of FIG. 4. In operation, the output of the write driver is fed to record head 13. Negative feedback of the output of the write driver is fed back to pin P5 of the operational amplifier through trimming potentiometer 16. Trimming potentiometer 16 is adjusted to adjust the overall gain of the write driver. The output of AND gate 11 is fed into pin P6 of operational amplifier 14 through a DC blocking capacitor. The 10K ohm resistor and the 1K ohm resistor form voltage dividers across which voltages are dropped to achieve suitable levels of voltage at pins P6 and P5 of operational amplifier 14. The output of operational amplifier 14 is taken from pin P11 thereof and fed into pin P4 of current amplifying buffer 15. The output of the write driver is taken from pin P3 of current amplifying buffer 15.

Thus, in accordance with the practice of the present invention, controlled-width-synchronization of recorded pixels is achieved. Optical encoder 6 constitutes means for generating a signal at a frequency which is a multiple of a desired recording frequency and means for generating a signal indicative of the magnetic recording head position; the circuitry of FIGS. 2 and 3 constitutes means for delaying the recording of a track to within a pixel length of time and means for dividing the pixel length of time to some predetermined plurality of track recording starting points.

It will be appreciated that delay circuit 21 and counter 24 can be provided with switches as shown in FIG. 3 by which the amount of delay in circuit 21 and the track length pixel count in counter 24 can be selectively varied. This embodiment is preferred in order to achieve the objectives of the present invention under varying conditions of rotational speed of recording and track pixel length, as desired.

It will be appreciated that other modifications and ramifications of the present invention will occur to those skilled in the art upon a reading of the present disclosure. For example, while the preferred embodiment described and shown in the Figures utilized integrated circuitry, it would be appreciated that equivalent circuitry comprised of discrete components can be utilized.

While optical encoder 6 can be that available from Renco Corporation of Galeta, California under Item No. KT23A-1000-3C-18-1-G-½, it would be appreciated that other optical encoders either commercially available or custom manufactured can be employed without departing from the spirit of the present invention. For example, it would be readily appreciated that more than two channels in optical encoder 6 can be employed, channels two through n being employed respectively for record heads two through n. With appropriate multiplexing of signals or with appropriate multiple circuitry, each magnetic recording head can be controlled in the same manner as herein described for the one magnetic recording head illustrated.

What is claimed is:

1. Magnetic imaging apparatus for providing controlled-width-synchronization of recorded pixels, comprising:
   (a) a rotational recording member having a record head mounted thereon;
   (b) means for generating a first signal at a frequency which is a multiple of a predetermined recording frequency;
   (c) means for generating a second signal indicative of the position of said record head during rotation of said rotational recording member;
   (d) means for generating a third signal at the desired recording frequency, said means capable of initiating the generation of said third signal at the beginning of a time period division of a pixel recording time length upon receipt of said second signal and capable of terminating said generation of said third signal at a predetermined number of recorded pixels, the number of said time period divisions within a pixel recording time length being equal to the multiple of said first signal frequency with respect to said predetermined recording frequency; and
   (e) means for driving said record head at the frequency of said third signal.

2. The magnetic recording apparatus of claim 1 wherein said means for generating said third signal comprises first and second pulse synchronizers, said first pulse synchronizer adapted to receive said first and second signals and adapted to pass said first signal therethrough upon receipt of said second signal, said second pulse synchronizer adapted to receive the said first signal and to pass said first signal therethrough upon receipt of a start pulse; a delay circuit for receiving said first signal from said first pulse synchronizer and, upon a predetermined event, stopping said first pulse synchronizer and starting said second pulse synchronizer; a frequency division circuit adpated to receive said first signal passing through said second pulse synchronizer and generating said third signal; and, a counter circuit for counting the pulses of said third signal up to a predetermined number and thereupon reset said division circuit and stop said second pulse synchronizer.

3. The magnetic imaging apparatus of claim 2 wherein said delay circuit comprises means for selectively varying the occurrence of said event.

4. The magnetic imaging apparatus of claim 3 wherein said counter circuit comprises selectively variable counters.

5. The magnetic imaging apparatus of claim 1 wherein said means for generating said first signal comprises an optical encoder.

6. The magnetic imaging apparatus of claim 1 wherein said means for generating said first signal comprises a magnetic encoder.

* * * * *